Nov. 4, 1941. F. BUECHMANN Re. 21,934

PRESSURE GAUGE

Original Filed Dec. 13, 1938

INVENTOR.
FREDERICK BUECHMANN
BY John P. Chandler
his ATTORNEY.

Reissued Nov. 4, 1941 Re. 21,934

UNITED STATES PATENT OFFICE 21,934

PRESSURE GAUGE

Frederick Buechmann, New York, N. Y., assignor to Certified Gauge & Instrument Corporation, a corporation of New York Original No. 2,239,697, dated April 29, 1941, Serial No. 245,476, December 13, 1938. Application for reissue June 28, 1941, Serial No. 400,331

7 Claims. (Cl. 73—109)

This invention relates to new and useful improvements in indicating devices and relates more particularly to an improved movement for measuring and indicating instruments generally, and more specifically devices for indicating fluid pressure.

The so-called Bourdon type of pressure gauge has been in rather extensive use for many years, such gauge comprising a bronze tube of elliptical cross-section, said tube being bent into a substantially circular form. One end of this tube is soldered to a central block positioned within a casing, the fluid entering such block and passing into the tube. The opposite end of the tube is sealed and in the usual run of prior art devices, this end is connected by means of a link to a pivoted, curved rack portion, the teeth of which mesh with those of a pinion on a pointer shaft. In order to prevent the backlash or other free play between the teeth of the rack and pinion, a hair spring is usually employed for the purpose of exerting constant pressure on the pinion. This type of movement is, however, relatively unsatisfactory for the reason that despite the presence of the spring, backlash is not eliminated and, as the result, the readings taken are frequently inaccurate. Another reason for the inaccuracy in a movement of this character which converts the movement of the end of the tube into rotary movement, is in the fact that it is impossible to make the teeth sufficiently accurate within the cost limits of a reasonably priced article to provide an accurate gauge.

The present invention is directed primarily to an improved type of mechanical movement for use in this connection, the movement including a pivoted sector cam structure, preferably made from sheet metal. This pivoted cam has a link connection with the free end of the tube and is the driving element of the movement. A cylindrical cam structure, the driven element, is mounted upon and keyed to the pointer shaft, such cam structure being formed with a spirally disposed annular recess having a predetermined angle relative to the plane of rotation of the pointer shaft. The sector cam is appropriately formed to have its cam face on the same angle relative to its plane of rotation as is the spiral recess, the opposed cam surfaces of such sector cam engaging the side walls of the annular spirally disposed recesses in the cylindrical cam structure.

In the prior art devices of the type previously described and employing the quadrantal pivoted rack, and the pinion on the pointer shaft, it was impossible to avoid a very considerable amount of free play between the rack and pinion, since if a tight engagement were provided, the parts would not freely move. In the present invention, however, the sector cam may be made of material of substantially the same thickness as the width of the spiral cam slot in the cylindrical cam structure. Thus a relatively tight fit is provided between the base walls of the cam slot, without, however, causing any binding or lack of free motion. Thus, as the pressure within the tube increases and causes the free end thereof to make its substantially longitudinal movement, the sector cam moves through an arc by virtue of its link connection with the free end of the tube, thus causing the cylindrical cam structure to rotate in strict accordance with the movement of the free end of the tube.

From the foregoing it will be obvious that one of the principal objects of the invention is the provision of an indicating instrument having a movement of far greater accuracy than was possible by the use of the old type of movement.

Another object of the invention is the provision of an improved movement for pressure gauges wherein the amount of wear is greatly minimized and the gauge will enjoy a far longer life than is possible with the old type of structure.

A further object of the invention is the provision of a relatively inexpensive pressure gauge wherein the possibility of backlash is eliminated.

Yet another object of the invention is to provide an improved indicating instrument with novel means for effecting an adjustment of the parts.

Figure 1:
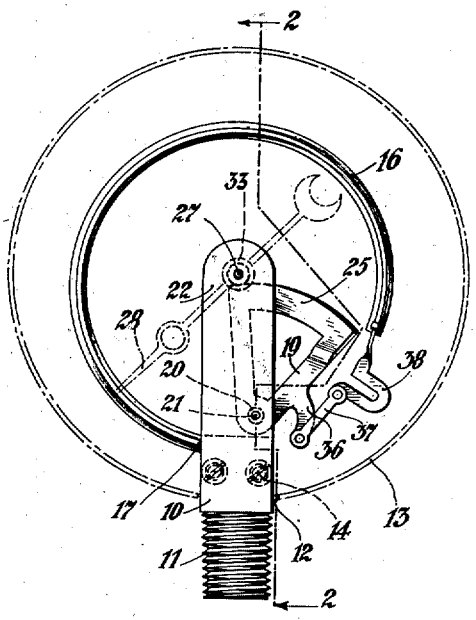
Fig. 1 is a front elevation of the preferred embodiment of the present invention, the view showing the casing for the pressure gauge in broken lines.
Figure 2:
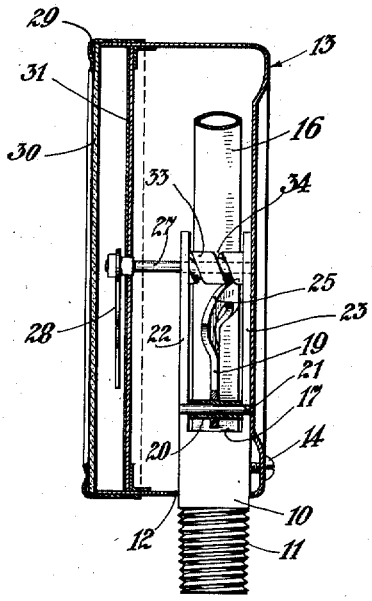
Fig. 2 is a vertical section taken on line 2—2 of Fig. 1.

Figs. 1 and 2, in addition to showing the details of the preferred embodiment of the present invention, likewise indicate the conventional parts of a pressure gauge of the type previously described. Pressure gauges of this character may, of course, be used for both positive and negative fluid pressure.

The device comprises a central block 10 through which the fluid enters, such block having a threaded portion 11 to enable it to be secured to the fluid conduit. This block is mounted in a suitable aperture 12 at the lower end of a circular casing 13 by means of screws 14. The pressure tube 16 is preferably made from bronze unless it is to be used in extremely high pressures, in which case steel is the more preferred material. This tube is, as shown in Fig. 2, elliptical in transverse section and is bent into a substantially circular form, one end of the tube being suitably secured at 17 to the block, the usual fluid connection being provided between the block and the tube. The sector cam 19 is preferably made from flat sheet metal and is provided with a bearing portion 20 for mounting the same upon a pivot 21, which pivot is supported between two spaced upstanding projections 22 and 23 of the central block. It will be noted from an examination of Fig. 2 that the cam surface 25 of the sector cam is bent to form an angle relative to the plane of rotation of the cam. The angle may vary, depending upon the nature of the particular instrument, although in actual practice, an angle of 18° or thereabouts is most satisfactory. This cam portion 25 should be of uniform thickness throughout its length and likewise should be perfectly flat.

A pointer shaft 27 is likewise pivotally mounted between the upstanding portions 22 and 23 adjacent to the upper ends thereof, such shaft having a pointer 28 at the front end thereof. The casing is further provided with a removable cover 29 supporting a glass face 30 through which the indicator and the face of the instrument 31 may be observed, such face 31 having the usual graduations thereon (not shown). Also mounted upon and keyed to this pointer shaft is a cylindrical, driven cam structure 33 provided with an annular spirally disposed recess 34, forming opposed cam faces. When the axes of said driven cam structure 33 and of cam surface 25 are parallel, as illustrated, the angle of the opposed cam faces relative to a plane of rotation of the cam structure 33 must, of course, be the same as the angle of the cam face 25 relative to a plane of its rotation. In other words, said cam face 25 must lie in a plane corresponding to the lead angle of the spiral recess, i. e., the angle between the cam face of the spiral recess and a plane of its rotation, thus causing the sector cam to exert a thrust against the spiral cam face imparting rotative motion thereto and causing progressive engagement between the respective cam faces. Also, the width of the slot, which must be uniform throughout its length, is desirably substantially the same as the thickness of the material from which the sector cam is constructed. The fit should not be so tight as to cause any binding, although it must be sufficiently close in order to provide substantially no lateral movement of the sector cam within the recess.

Figure 5:
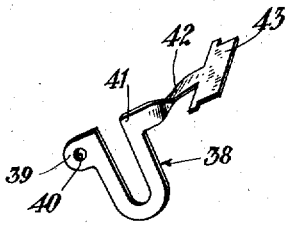
Fig. 5 is a perspective view of the improved adjustable means for forming the link connection between the free end of the extension tube and the sector cam.

The sector cam is further provided with a curved extension portion 36 to which is secured a link 37. Between this link 37 and the free end of the tube, a substantially U-shaped adjustment link 38 is positioned. This link is shown in detail in Fig. 5 and comprises a terminal portion 39 having an aperture 40 therein to provide connection between this link and the link 37. The opposite terminal 41 of this U-shaped portion is provided with an extension portion 42, the end of which is provided with a transverse extension 43. This portion 43, as well as a portion of the extension 42, is bent at right angles to the body of the link, as is clearly shown in Fig. 5. The transverse portion is positioned within the free end of the expansion tube and is soldered therein, thus closing this end of the tube. Accordingly, when it is desired to make some adjustment between the sector cam and the closed end of the tube, this U-shaped portion is readily bent to bring the spaced arms of this U-shaped portion toward or away from each other, as the case may be.

Figure 3:
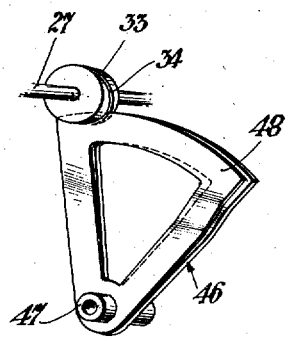
Fig. 3 is a perspective view showing a slightly modified form of sector cam.
Figure 4:
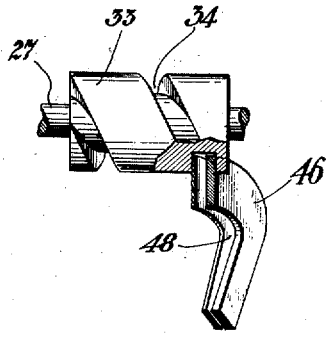
Fig. 4 is a front elevation of the cylindrical cam with its annular spirally disposed cam surface, the view also showing the modified form of sector cam in engagement therewith.

The modification of the invention illustrated in Figs. 3 and 4 comprises a sector cam 46 having a bearing portion 47, this cam, however, being made from relatively thinner material than the cam in the first embodiment, the cam further having an adapter spring 48 of exactly the same size and contour as the cam itself. The adapter spring 48 is so adjusted relative to the cam as to cause the opposed faces of cam and spring to lightly engage the opposed faces of the recesses 34 in the cylindrical cam, thereby providing an accurate transmission of movement from the tube to the pointer shaft.

It will be appreciated that whereas the foregoing movement is shown in connection with a fluid pressure gauge of the so-called Bourdon type, it will nevertheless have many other uses in measuring instruments of all descriptions.

The foregoing structures may be considerably modified without departing from the spirit of the invention. For instance, instead of employing the pivoted cam, a substantially centrally pivoted lever or bell crank lever may be employed, one end of such lever being actuated by the measuring device and the other end driving the cylindrical cam.

What I claim is:

1. In a pressure gauge having a pointer shaft, a pointer carried thereby and a curved pressure tube elliptically shaped in transverse section, one end of such tube being fixed and operatively connected with a fluid conduit, the opposite end thereof being free and closed, the combination of means connecting such free end with the pointer shaft, whereby the substantially longitudinal movement of the free end of the tube will be transmitted to the shaft, such means comprising a pivoted sector driving cam plate, a link connecting the free end of the tube with such cam plate, the cam surface of such plate lying on one plane and at an angle to a plane of rotation of the cam plate, and a cylindrical sleeve mounted on the pointer shaft, said cylindrical sleeve having a spiral groove formed with a lead angle corresponding to the angle of the cam surface of the sector driving cam plate, said cam surface fitting in the spiral groove for rotating the pointer shaft.

2. In a fluid pressure gauge including a pressure tube, a pointer shaft and a pointer mounted thereon, the combination of means for transmitting movement from the free end of the pressure tube to the pointer shaft, comprising a cylindrical sleeve mounted on the pointer shaft and having a spiral recess therein having a substantially uniform lead angle throughout its length, a pivotally mounted sector cam plate operatively connected with the free end of the pressure tube and having a cam surface lying on a plane corresponding to the lead angle of the spiral recess, such cam surface residing in said recess and adapted to impart rotative movement to the pointer shaft.

3. A fluid pressure indicator comprising a pressure tube, a pointer shaft and a pointer carried thereby and means for transmitting movement from the free end of the pressure tube to the pointer shaft, such means including a cylindrical sleeve associated with the pointer shaft having a spiral groove of substantially uniform width and lead angle throughout its length, a pivotally mounted sector cam structure formed in two complemental portions of substantially the same size and shape, the cam portions of the cam structure being positioned within said recess and adapted to yieldingly engage the opposed edges thereof, such cam portions lying on a plane corresponding to the lead angle of the spiral recess and adapted to impart rotative movement to the sleeve as the cam plate turns under the actuation of the pressure tube.

4. A fluid pressure indicator comprising a pressure tube, a pointer shaft and a pointer carried thereby and means for transmitting movement from the free end of the pressure tube to the pointer shaft, such means including a cylindrical sleeve mounted on the pointer shaft and having a spiral groove having a substantially uniform lead angle throughout its length, a pivotally mounted sector cam plate operatively connected with the free end of the pressure tube and adapted to drive the sleeve, the cam portions of such cam plate lying on a plane corresponding to the lead angle of the spiral recess, one surface of such cam plate engaging one edge of the recess, and a spring pressed adapter plate of substantially the same size as the cam plate adapted to yieldingly engage the other edge of the recess.

5. A fluid pressure gauge including a frame, a pressure tube rigidly mounted at one end thereof on the frame and being free to move at its opposite end, a plurality of shafts journalled in the frame, a pointer carried on one of the shafts and means for providing an operative connection between the free end of the pressure tube and the pointer shaft to translate the substantially reciprocating movement of the free end of the tube to rotative movement of the pointer shaft, said means comprising a driving cam and a driven cam mounted on the several shafts and means connecting the driving cam with the free end of the tube, one of such cams being generally cylindrical in shape and having an annular spiral recess therein having a substantially uniform lead angle throughout its length, the other cam being formed with a cam surface lying on a plane corresponding to the lead angle of the spiral recess and being positioned within said recess.

6. A fluid pressure gauge including a frame, a pressure tube rigidly mounted at one end thereof on the frame and being free to move at its opposite end, a plurality of shafts journalled in the frame, a pointer carried on one of the shafts and means for providing an operative connection between the free end of the pressure tube and the pointer shaft to translate the substantially reciprocating movement of the free end of the tube to rotative movement of the pointer shaft, said means comprising a driven cam mounted on the pointer shaft and a driving cam on a second shaft, and means connecting the driving cam with the free end of the tube comprising a substantially U-shaped link, the driven cam being generally cylindrical in shape and having an annular spiral recess therein having a substantially uniform lead angle throughout its length, the driving cam being formed with a cam surface lying on a plane corresponding to the lead angle of the spiral recess and being positioned within said recess.

7. In a measuring instrument having means responsive to changes in conditions and being formed with an element which is movable in accordance with such changes in conditions, the combination of a pointer shaft, a pointer carried thereby, and means for transmitting the movement of the responsive element to the pointer shaft, said means comprising a driven, spiral cam provided on the indicator shaft, a driving, sector cam plate pivotally mounted on an axis substantially parallel to the pointer shaft, operatively connected with said responsive element and lying at an angle corresponding generally to the lead angle of the driven spiral cam, the cam plate exerting a thrust against the face of the spiral cam imparting rotative motion thereto and causing progressive engagement between the respective faces of the sector cam plate and the spiral cam.

FREDERICK BUECHMANN.